Patented May 30, 1939

2,160,438

UNITED STATES PATENT OFFICE 2,160,438

CERAMIC MOLD

George V. McCauley, Corning, N. Y., assignor to Corning Glass Works, Corning, N. Y., a corporation of New York No Drawing. Application August 4, 1936, Serial No. 94,288

4 Claims. (Cl. 49—65)

This invention relates to ceramic mold parts such as molds and cores for forming and shaping glass bodies from molten glass and has for its principal object to prevent the material of the mold or mold parts from sticking to the glass body after the latter has cooled.

Another object of the invention is to prevent the evolution of gas from the mold and cores into the molten glass whereby bubbles would be formed in the glass body.

A further object of the invention is to prevent shrinkage of the mold or mold parts on being heated or fired and thus to maintain accurate dimensions therein.

The above and other objects may be attained by practicing my invention which embodies among its features a ceramic refractory mold part at least a portion of which is composed of a mixture consisting of silica, alumina and a flux or bond such as alkali or kaolin and containing not more than 17% of alumina and not more than 2% of the flux or bond.

Another feature of the invention is a ceramic mold part composed of thermally non-conducting refractory material and coated on its surface with a layer of the above described composition.

It is well known that highly heated molten glass, when cooled in contact with refractory bodies composed of the usual refractory clays will adhere thereto and cause cracking of the glass. Intermediate refractory coatings which will not stick to the glass or which are friable and will break away from the main refractory body have not been entirely satisfactory because shrinkage on firing prevents maintenance of a high degree of accuracy in the dimensions of the molded glass and destroys the fine details of any design which it is desired to impress on the glass.

When molten glass is poured on to some porous refractories an evolution of gas occurs which forms bubbles in the glass. This is due in most instances to the expansion of the air in the pores of the refractory but under some conditions fine bubbles may continuously be evolved from the refractory by the decomposition of certain constituents therein by the hot glass.

By means of the invention to be hereinafter more fully described, it is now possible to prepare ceramic mold parts which will not adhere to glass bodies cooled in contact therewith nor evolve gas nor shrink appreciably on being fired.

In accordance with my invention the mold parts are made of a mixture consisting of silica, alumina and an alkali such as soda ash. These materials are preferably ground to pass a screen of 150 mesh or finer in order to secure intimacy of mixing. The mold parts are made in the usual manner by moistening the mixture with sufficient water to permit forming it in the desired shapes by ramming, pressing, casting, etc. The finished shapes are then burned to temperatures ranging from 600° C. to 1400° C., depending upon the service for which they are to be used. For casting massive glass bodies such as telescope discs where the glass is maintained in a molten condition for a relatively long time and may even be reheated while in the mold, the mold parts should be burned at the higher temperature.

The range of proportions that are suitable for my purpose are approximately 83–96 $SiO_2$, 4–17 $Al_2O_3$ and 1/8–2 alkali oxide. Both the alumina and the alkali have a fluxing action and hence for purposes requiring a high temperature the amount of these constituents should be decreased in order to avoid sticking. The proper proportions for any specific purpose may readily be determined by trial.

A particularly suitable composition for general use and especially for high temperature use consists of approximately 95 $SiO_2$, 5 $Al_2O_3$ and 1/8 alkali oxide. The latter composition corresponds to the eutectic in the binary silica-alumina system. I have found that this eutectic composition has substantially no shrinkage when fired.

The above described compositions are extremely friable and, although they possess the required strength when sintered to permit forming and shaping, they will not adhere to glass but can be dusted off from the cold glass surface leaving it substantially untarnished.

In addition to being suitable for solid mold parts, such as cores which not only must not adhere to the glass but also must maintain accurate dimensions, these compositions are particularly suitable for coating the surface of mold parts which are composed of ordinary refractories. For example, a mold may be constructed of the porous or multicellular refractories commonly used for high temperature insulation and the glass contacting surface of such mold may be coated with a thin layer of the above described composition. Such coating is best applied by adding sufficient water to the composition to form a slip and painting or brushing it onto the surface to be coated. In this manner mold parts may be prepared which are light in weight, resistant to high temperatures and thermally substantially non-conducting and which at the same time will not adhere to glass nor permit the evolution of gas from the refractory into the glass.

Although an alkali oxide introduced, for example, as sodium carbonate makes a convenient and efficient bond for my refractory, I have found that kaolin or other raw bonding clay is equally suitable when used in the same proportions.

I have used the term "mold part" herein to include either the mold and parts thereof or its cores and the same meaning is to be understood in the claims hereunto appended.

I claim:

1. A ceramic refractory mold composed of a multi-cellular insulating refractory and coated with a layer consisting of silica, alumina and a bond, the alumina being not more than 17% and the bond not more than 2% of the layer.

2. A ceramic refractory mold composed of multi-cellular insulating refractory and coated with a layer consisting of silica, alumina and alkali oxide, the alumina being not more than 17% and the bond not more than 2% of the layer.

3. A ceramic refractory mold composed of multi-cellular insulating refractory and coated with a layer consisting of about 95 parts of silica, 5 parts of alumina and ⅛ part of alkali oxide.

4. A ceramic refractory mold composed of multi-cellular insulating refractory and coated with a layer consisting of about 95 parts of silica, 5 parts of alumina and ⅛ part of kaolin.

GEORGE V. McCAULEY.